July 29, 1958 M. J. DI TORO ET AL 2,845,599

VOLUME EXPANDER

Filed Feb. 11, 1954

INVENTORS
MICHAEL J. DI TORO
WALTON GRAHAM
STANLEY M. SCHREINER
BY Percy P. Lantzy
ATTORNEY

United States Patent Office 2,845,599

Patented July 29, 1958

2,845,599

VOLUME EXPANDER

Michael J. Di Toro, Massapequa, and Walton Graham, East Meadow, N. Y., and Stanley M. Schreiner, Clifton, N. J., assignors to International Telephone and Telegraph Corporation, Nutley, N. J., a corporation of Maryland Application February 11, 1954, Serial No. 409,602

7 Claims. (Cl. 332—38)

Figure 2:
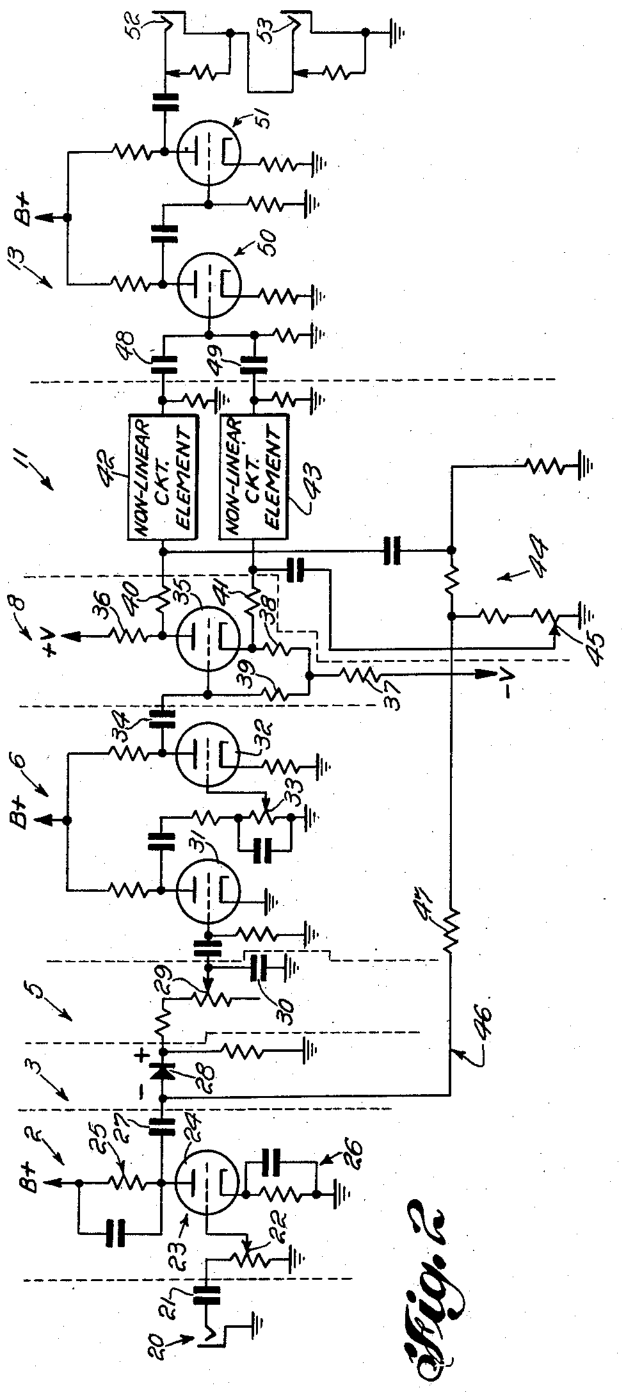

This invention relates to volume expansion systems and more particularly to volume expanders of the kind wherein a voltage proportional to the signal to be expanded is extracted and this voltage after amplification controls the gain of the volume expansion system.

Volume expanders are essentially amplifiers in which the amplification factor or gain is varied in accordance with the envelope amplitude of the applied signal which is to be expanded. It is well-known that the volume expansion of modulated signals increases the human ear's ability to detect the presence of modulation. Any minute changes in tone intensity can be made audible to the human ear by the process of volume expansion. If enough expansion is used the factor which limits the detection of modulation is the inherent intensity fluctuation of any noise that is present in the signal. Heretofore, substantially all of the volume expanders known to the prior art varied the volume expansion of the input signal by a predetermined factor which was proportional to the amplitude of the input signal itself. Thus, if the input signal varied by a factor such as 10%, then the amplitude variable element such as a variable gain tube or a variable impedance had its control voltage changed by 10% and the resultant volume expansion was entirely dependent upon the non-linear characteristics of the expansion element and the limitation upon the amount of possible expansion was the degree of non-linearity of the expanding element.

Amplitude modulation may be detected by a linear detector and the detected modulation voltage filtered to eliminate as much noise as possible. The filtered detected modulation voltage can then be used to vary the gain of a volume expander. In one type of volume expander the filtered detected signal controls a non-linear circuit element such as a non-linear resistance which, in turn, varies the output signal level. The direct voltage component of the filtered detected voltage determines the operating point about which the non-linear element is varied by the alternating voltage component due to the amplitude modulation of the input signal. The direct voltage component has a minimum value which must be great enough so that the resistance of the non-linear element is small when compared to the capacitive reactance of the element at the highest frequency to be expanded. The direct voltage component also has a maximum value above which the variation in the resistance with voltage of the non-linear element is insufficient for the desired degree of expansion. These limitations have hampered the users of volume expanders.

It is an object of this invention, therefore, to provide a volume expansion system which overcomes the aforementioned limitations.

Another object of this invention is to provide a volume expander system in which the limitation of the degree of non-linearity of the expanding element is substantially eliminated.

A further object of this invention is to provide a volume expander in which a voltage proportional to the intensity variations of the incoming signal is amplified to any degree desired and then controls the gain of the system.

One of the features of this invention is the provision of a volume expander in which an alternating voltage proportional to the intensity variations of the incoming signal is extracted and after filtering to eliminate noise, it is amplified as much as desired. The amplified voltage is then utilized to vary the direct voltage bias and thus the gain of the volume expansion system providing a substantially unlimited degree of volume expansion. Essentially, an input audio modulated signal has its envelope detected and the alternating voltage portion thereof is amplified and passed through a phase splitter controlling a pair of non-linear circuit elements such as a non-linear resistance which determine the expansion of the input audio modulated signal. The direct voltage component of the detected input signal is eliminated and a constant voltage bias is supplied across the non-linear element through a high resistance. The alternating voltage component of the input signal is amplified and used to vary the resistance of the non-linear circuit element by varying the voltage bias. In this way a greater amount of expansion is possible and the dynamic range of the non-linear circuit elements is increased.

Figure 1:
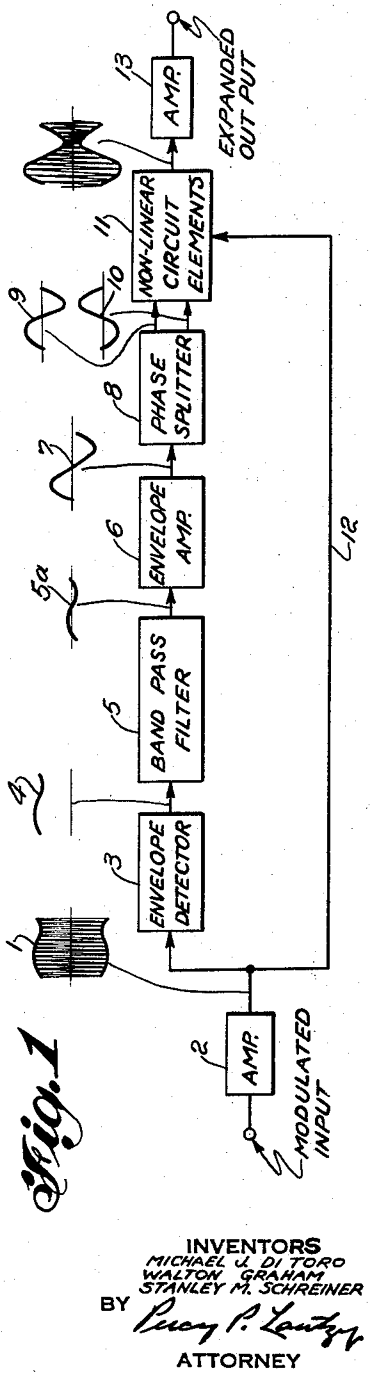

The above-mentioned and other features and objects of this invention will become more apparent by reference to the following description taken in conjunction with the accompanying drawings, in which:

Fig. 1 is a simplified schematic diagram in block form of one embodiment of the volume expander of this invention; and Fig. 2 is a simplified schematic diagram of the block diagram shown in the embodiment of Fig. 1.

Referring to Fig. 1 of the drawing, a simplified block diagram of one embodiment of the volume expander in accordance with the principles of this invention is shown wherein an amplitude modulated input audio signal 1 is coupled to an audio amplifier 2. The output of the audio amplifier is coupled to an envelope detector 3 which may comprise in one embodiment a diode rectifier. The detected envelope wave 4 is coupled to a bandpass filter 5 whose output 5*a* is amplified in an envelope amplifier circuit 6. The amplified envelope wave 7 from the output of envelope amplifier 6 is coupled to a phase splitter 8 whose outputs 9 and 10 are 180° out of phase and vary the resistance of the non-linear circuit element 11. The amplified audio signal from audio amplifier 2 is coupled around the envelope amplifier via line 12 to the non-linear circuit element 11 where its level is varied in accordance with the signal which was developed proportional to its own intensity and coupled to the non-linear circuit element 11. A conventional amplifier 13 is provided which eliminates transients in the output caused by the control voltage of the amplifier circuitry.

Referring to Fig. 2 of the drawing, a simplified circuit diagram of the embodiment of the volume expander in accordance with the principles of this invention is shown wherein the various circuit elements corresponding to the blocks shown in Fig. 1 are denoted by dotted lines identified by numerals identical with the numerals of Fig. 1. A jack 20 is provided to which an input amplitude modulated audio signal is coupled. A coupling capacitor 21 couples the input signal to a potentiometer 22. The output of the potentiometer 22 is coupled to a usual Class A audio amplifier 2 comprising an electron discharge device 24 having the usual plate circuit 25 and cathode circuitry 26. The plate output of amplifier 23 is coupled via capacitor 27 to a diode rectifier 28 where the envelope wave of the amplified amplitude modulated signal is detected. The detected envelope wave is coupled to an RC (resistor-capacitor) bandpass filter 5. The adjustment of the resistance element 29 in conjunction with the capacitor 30 of the bandpass filter 5 determines the time of response of the volume expander and thus this system may be made insensitive to sharp modulation peaks due to noise. The output of the bandpass filter 5 is amplified in the two triode circuits 31 and 32 which together form the envelope amplifier 6. The potentiometer 33 coupled between the triode circuits 31 and 32 control the amount of amplification of the detected envelope wave. The amplified envelope wave is coupled via capacitor 34 to a phase splitter circuit 8. The phase splitter circuit 8 comprises a triode 35 with a positive voltage applied through resistor 36 to the plate and a negative voltage applied through resistors 37 and 38 to the cathode. A usual grid leak resistor 39 is coupled between the cathode circuit and the grid. The positive phase from phase splitter circuit 8 is coupled over resistor 40 to the non-linear circuit element which, for example, comprises a non-linear resistor 42 in which the current passed is proportional to a power of the applied voltage. The negative phase, 180° out of phase with the signal coupled through resistor 40, is coupled through resistor 41 to a second non-linear circuit element, also comprising a non-linear resistor 43. It is apparent that a direct voltage bias is placed upon each of the non-linear circuit elements 42 and 43, the positive bias being applied via resistors 36 and 40 to non-linear circuit element 42 and the negative bias being applied via resistors 37, 38 and 41 to the non-linear circuit element 43. The output of the phase splitter circuit 8 is the amplified alternating voltage portion of the detected envelope wave of the input signal. The positive phase output of the amplified alternating voltage is coupled from the plate of tube 35 to resistor 40 while the negative phase output is coupled from the cathode to resistor 41. Thus the alternating voltage components are combined in resistors 40 and 41 with the direct voltage bias and vary the bias actually applied to the non-linear circuit elements 42 and 43. In the past the actual range of usable direct voltage bias applied across non-linear resistors 42 and 43 was limited on the lower side by the capacity of the non-linear circuit elements and on the high end by the small change in dynamic resistance with a change in applied voltage. However in this invention these limitations are avoided by placing the fixed average direct voltage across the non-linear circuit elements 42 and 43 and varying this biasing voltage by the amplified filtered envelope of the detected signal. With this arrangement there is practically no limit to the amount of volume expansion which can be obtained because the expansion is independently controlled by the gain of the envelope amplifier. In order to ensure that the characteristics of each of the non-linear circuit elements will be identical a balance circuit 44 is provided with which an adjustment can be made to compensate for any physical differences between the non-linear circuit elements 42 and 43, the adjustment comprising the setting of the potentiometer arm 45. The output of the audio amplifier 2 is also coupled via line 46 through resistor 47 and balancing circuit 44 to the inputs of each of the non-linear resistors 42 and 43 where the signal is amplified in accordance with the control signal derived from the phase splitter circuitry 8.

The output of the non-linear elements 42 and 43 are capacitively coupled to the grid of audio amplifier 50. The output of audio amplifier 50 is coupled to another usual audio amplifier 51. The input to the grid of audio amplifier 50 comprises the output of the two channels each containing one of the non-linear circuit elements 42 or 43. In order to eliminate the effect of transients due to a changing signal level (i. e., the output signal being superimposed on a varying D.-C. bias voltage) the two channels of opposite direct voltage polarity (cophased A.-C. polarity) are used so that the transients cancel at the output which is the input to the audio amplifier 50. The output of audio amplifier 51 is coupled to a pair of jacks 52 and 53 to which the usual headphone plugs or other output device may be connected.

While we have described above the principles of our invention in connection with specific apparatus, it is to be clearly understood that this description is made only by way of example and not as a limitation to the scope of our invention as set forth in the objects thereof and in the accompanying claims.

We claim:

1. A volume expander comprising a non-linear circuit element, a source of amplitude modulated input signals, means to couple said source to said circuit element, means coupled to said source to detect the alternating voltage component of the envelope wave of said input signals, means coupled to said means to detect to amplify said component, means to apply a direct voltage bias to said circuit element and means coupled to said means to amplify to vary said direct voltage bias responsive to said amplified alternating voltage component whereby said input signals coupled to said circuit element are expanded due to the non-linear characteristics of said circuit element.

2. A volume expander according to claim 1 wherein said non-linear circuit element comprises a non-linear resistance wherein its current flow is proportional to a power of the applied voltage.

3. A volume expander comprising a non-linear circuit element, a source of amplitude modulated input signals, means to couple said source to said circuit element, means coupled to said source to detect the envelope wave of said input signals, means coupled to said means to detect to filter out the alternating voltage component of said envelope wave, means coupled to said means to filter to amplify said component, means to apply a direct voltage bias to said circuit element, means coupled to said means to amplify to control said direct voltage bias responsive to said amplified alternating voltage component whereby said input signals are volume expanded due to the non-linear characteristics of said circuit element.

4. A volume expander comprising a non-linear circuit element, a source of amplitude modulated input signals, means to couple said source to said circuit element, means coupled to said source to obtain an alternating voltage proportional to the intensity variations of said input signals, means to apply a direct voltage bias to said circuit element, means coupled to said means to obtain to amplify said alternating voltage and means coupled to said means to amplify to vary said direct voltage bias responsive to said amplified alternating voltage.

5. A volume expander comprising a pair of non-linear circuit elements, a source of amplitude modulated input signals, means to couple said source to said circuit elements, means coupled to said source to detect the envelope wave of said input signals, means coupled to said means to detect to filter out the alternating component of said envelope wave, means coupled to said means to filter to amplify said alternating component, phase splitter means coupled to said means to amplify to obtain a pair of signals 180° out of phase each representative of said amplified alternating component, means to bias each of said circuit elements with a direct voltage, means coupled to said phase shifter means to vary the bias on each of said circuit elements with one of said pair of signals, and output means for combining the outputs of said pair of non-linear circuit elements.

6. A volume expander according to claim 5 which further includes means to balance the characteristics of each of said non-linear circuit elements to cause the said pair to have substantially identical non-linear characteristics.

7. A volume expander according to claim 5 wherein each of said non-linear circuit elements comprises a resistance which passes current proportional to a power of the applied voltage.

References Cited in the file of this patent

UNITED STATES PATENTS

| | | |
|---|---|---|
| 2,012,433 | Myers | Aug. 27, 1935 |
| 2,152,016 | Baesecke | Mar. 28, 1939 |
| 2,545,232 | Hings | Mar. 13, 1951 |